United States Patent
Kudo et al.

(10) Patent No.: US 9,613,415 B2
(45) Date of Patent: Apr. 4, 2017

(54) PROTECTIVE FILM DETECTING APPARATUS AND PROTECTIVE FILM DETECTING METHOD

(71) Applicant: DISCO CORPORATION, Tokyo (JP)

(72) Inventors: Yu Kudo, Tokyo (JP); Yusaku Ito, Tokyo (JP); Tomoaki Endo, Tokyo (JP); Yukinobu Ohura, Tokyo (JP); Ayana Nakanishi, Tokyo (JP); Senichi Ryo, Tokyo (JP); Kentaro Odanaka, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 14/924,915

(22) Filed: Oct. 28, 2015

(65) Prior Publication Data

US 2016/0125591 A1    May 5, 2016

(30) Foreign Application Priority Data

Oct. 30, 2014   (JP) ................................. 2014-221400

(51) Int. Cl.
*G06K 9/00*  (2006.01)
*G06T 7/00*  (2017.01)

(52) U.S. Cl.
CPC .... *G06T 7/001* (2013.01); *G06T 2207/20224* (2013.01); *G06T 2207/30148* (2013.01)

(58) Field of Classification Search
CPC . G06T 2207/20224; G06T 2207/30148; G06T 7/001
USPC ......................................................... 382/141
See application file for complete search history.

(56) References Cited

U.S. PATENT DOCUMENTS 8,154,711 B1*  4/2012 Scheer .................. B05B 12/082
                                              356/3.01
2008/0015802 A1*  1/2008 Urano ................ G01N 21/4738
                                              702/81

FOREIGN PATENT DOCUMENTS

JP     10-305420     11/1998
JP     2007-201178   8/2007

* cited by examiner

*Primary Examiner* — Manuchehr Rahmjoo
(74) *Attorney, Agent, or Firm* — Greer Burns & Crain Ltd.

(57) ABSTRACT

Disclosed herein is a protective film detecting method including the steps of supplying a mist to a work surface of a workpiece in the condition where the work surface is coated with a protective film, applying light to the work surface of the workpiece, imaging the work surface of the workpiece after supplying the mist, and detecting an uncoated area where the protective film is not formed, by using a difference in light intensity between a coated area where the protective film is formed and the uncoated area where the protective film is not formed to cause the formation of asperities due to droplets formed from the mist supplied to the work surface of the workpiece and the occurrence of Mie scattering of the light applied to the asperities, the difference in light intensity being detected from an image obtained in the imaging step.

4 Claims, 7 Drawing Sheets

PROTECTIVE FILM DETECTING APPARATUS AND PROTECTIVE FILM DETECTING METHOD

BACKGROUND OF THE INVENTION

Field of the Invention

The present invention relates to a protective film detecting apparatus and method for detecting whether or not a protective film is properly formed on a work surface of a workpiece.

Description of the Related Art

As a method for dividing a workpiece such as a semiconductor wafer and an optical device wafer along streets formed on the workpiece, there has been proposed a method including the steps of applying a pulsed laser beam to the workpiece along the streets to thereby form a laser processed groove on the workpiece along each street and then breaking the wafer along each laser processed groove by using a mechanical breaking apparatus (see Japanese Patent Laid-open No. 1998-305420, for example). In this method, the laser beam is applied along each street, so that heat energy is concentrated at an area where the laser beam is applied, causing the generation of debris. Accordingly, there is a problem such that the debris may adhere to the front side of each device formed on the workpiece, causing a reduction in quality of each device.

To solve this problem, there has been proposed a laser processing apparatus capable of forming a protective film of polyvinyl alcohol etc. on one side (work surface) of the workpiece to which a laser beam is to be applied and applying the laser beam through the protective film to the workpiece (see Japanese Patent Laid-open No. 2007-201178, for example). This laser processing apparatus includes a nozzle for supplying a liquid resin to the workpiece, wherein the liquid resin is dropped from the nozzle to the workpiece and the workpiece is then rotated to thereby form the protective film over the work surface of the workpiece.

This protective film must be formed so as to cover a portion of the work surface where the debris may adhere to cause a reduction in quality of each device. However, there is a possibility that the liquid resin may be solidified and stick to the nozzle or bubbles may be mixed in the liquid resin, causing the production of an uncoated area where the protective film is not formed. In this uncoated area, the debris may adhere to the work surface to cause a reduction in quality of each device. Accordingly, after forming the protective film, it is necessary to grasp whether or not the protective film has been completely formed on the work surface of the workpiece without the uncoated area. As a method for confirming the condition of the protective film formed on the work surface of the workpiece, there is a method including the steps of spraying steam to the work surface coated with the protective film, applying light to the work surface, and detecting scattering of the light due to asperities formed by the steam deposited to the uncoated area.

SUMMARY OF THE INVENTION

However, due to the reflection and scattering of ambient light and the scattering of the light applied to patterns and projections on a wafer, there is a possibility of detection of any light other than the light scattered by the asperities formed by the steam deposited to the uncoated area, so that the determination whether or not the protective film is absent on the work surface becomes difficult. Further, in the case that a point light source such as a light bulb or a line light source such as a fluorescent lamp is used as a light source for emitting the light for imaging, there is a possibility that the light source may be reflected to appear in the image, so that the determination whether or not the protective film is absent on the work surface becomes difficult.

It is therefore an object of the present invention to provide a protective film detecting apparatus and method which can accurately determine whether or not the protective film has been completely formed on the work surface of the workpiece.

In accordance with an aspect of the present invention, there is provided a protective film detecting apparatus for detecting whether or not a desired area of a work surface of a workpiece is actually coated with a protective film formed on the work surface of the workpiece, the protective film detecting apparatus including: a holding table for holding the workpiece in a condition where the protective film is formed on the work surface of the workpiece; droplets forming means for forming droplets on the work surface of the workpiece held on the holding table; light applying means having a light source for emitting light to apply the light to the work surface of the workpiece held on the holding table; imaging means for imaging the work surface of the workpiece; image storing means for readably storing an image obtained by the imaging means; image processing means for processing the image stored by the image storing means; and detecting means for detecting an uncoated area where the protective film is not formed, by using a difference in light intensity between a coated area where the protective film is formed and the uncoated area where the protective film is not formed to cause the formation of asperities due to the droplets formed on the work surface of the workpiece by the droplets forming means and the occurrence of Mie scattering of the light applied from the light applying means to the asperities, the difference in light intensity being detected from information on the image obtained by the imaging means and from the result of processing by the image processing means.

Preferably, the light applying means applies infrared light and the imaging means selectively detects the infrared light applied by the light applying means. Preferably, the imaging means includes a camera for imaging part of the work surface of the workpiece; either a holding portion for holding the imaging means or the holding table has a function of moving the whole of the work surface of the workpiece in a range where the imaging means can image; and a relative position or angle between the workpiece and the imaging means is changed to image the condition of Mie scattering of the light applied from the light applying means on the whole of the work surface of the workpiece.

In accordance with another aspect of the present invention, there is provided a protective film detecting method for detecting whether or not a desired area of a work surface of a workpiece is actually coated with a protective film formed on the work surface of the workpiece, the protective film detecting method including: a holding step of holding the workpiece in a condition where the protective film is formed on the work surface of the workpiece; a droplets forming step of forming droplets on the work surface of the workpiece after performing the holding step; an imaging step of applying light from a light source to the work surface of the workpiece after performing the droplets forming step and then imaging the work surface of the workpiece; and a detecting step of detecting an uncoated area where the protective film is not formed, by using a difference in light intensity between a coated area where the protective film is formed and the uncoated area where the protective film is not formed to cause the formation of asperities due to the droplets formed on the work surface of the workpiece in the droplets forming step and the occurrence of Mie scattering of the light applied to the asperities in the imaging step, the difference in light intensity being detected from an image obtained in the imaging step.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
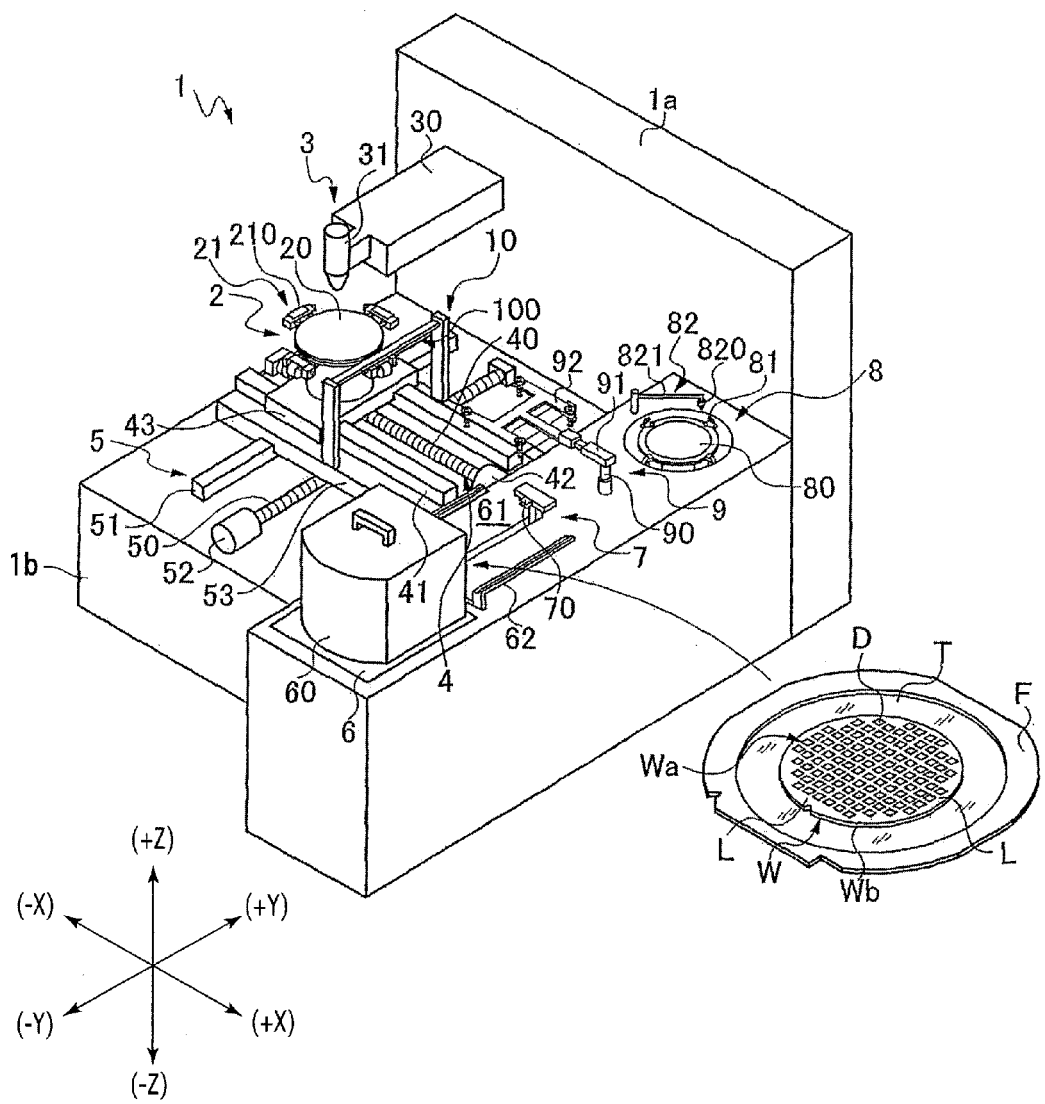
FIG. 1 is a perspective view of a laser processing apparatus including a protective film detecting unit according to the present invention.

Referring to FIG. 1, there is shown a laser processing apparatus 1. Reference symbol W denotes a wafer as a workpiece to be laser-processed. The wafer W is stored in a cassette 60. The laser processing apparatus 1 includes a cassette mounting area 6 for mounting the cassette 60, handling means 7 for handling the wafer W with respect to the cassette 60, protective film forming means 8 for forming a protective film on the front side of the wafer W taken out of the cassette 60, a holding table 2 for holding the wafer W after forming the protective film on the front side of the wafer W, and laser applying means 3 for applying a laser beam to the wafer W held on the holding table 2.

The cassette mounting area 6 is vertically movable. A plurality of slots for storing a plurality of wafers W are formed in the cassette 60 so as to be arranged in layers. By vertically moving the cassette mounting area 6, a desired one of the slots in the cassette 60 can be vertically positioned at a predetermined height in handling the wafer W with respect to the cassette 60 by the use of the handling means 7. A plurality of devices D are formed on the front side Wa of the wafer W stored in the cassette 60. The devices D are partitioned from each other by a plurality of crossing division lines L. The back side Wb of the wafer W is attached to a tape T. The tape T is supported at its peripheral portion to a ring frame F. Accordingly, the wafer W is supported through the tape T to the ring frame F in the condition where the front side Wa of the wafer W is exposed.

The handling means 7 is movable in the longitudinal direction of the apparatus 1 (in the Y direction). The handling means 7 includes a holding (nipping) portion 70 for holding (nipping) the ring frame F supporting the wafer W. In the condition where the ring frame F is held by the holding portion 70, the wafer W supported to the ring frame F can be taken out of the cassette 60 by moving the handling means 7 in the +Y direction. Conversely, when the handling means 7 is moved in the −Y direction in the condition where the ring frame F is held by the holding portion 70, the wafer W supported to the ring frame F can be stored into a predetermined slot in the cassette 60. A temporary placing area 61 for temporarily placing the wafer W taken out of the cassette 60 or to be stored into the cassette 60 is defined on the rear side of the cassette mounting area 6 in the +Y direction. The temporary placing area 61 is provided with a guide portion 62 for guiding the ring frame F and setting it at a predetermined position.

The protective film forming means 8 includes a holding table 80 for holding the wafer W under suction. A fixing portion 81 for fixing the ring frame F is provided on the outer circumference of the holding table 80. A resin supplying portion 82 for dropping a liquid resin onto the wafer W held on the holding table 80 is provided in the vicinity of the holding table 80. The resin supplying portion 82 includes a nozzle 820 for dropping the liquid resin and an arm portion 821 for moving the nozzle 820.

A transfer mechanism 9 is provided between the temporary placing area 61 and the protective film forming means 8. The transfer mechanism 9 includes a rotating shaft 90 having an axis extending in a vertical direction (Z direction), an expansive arm 91 extending from the upper end of the rotating shaft 90 in a horizontal direction, and a suction holding portion 92 provided at the front end of the expansive arm 91 for holding the ring frame F from the upper side thereof under suction. The rotating shaft 90 is rotatable about its axis and also vertically movable. The expansive arm 91 is expandable in a horizontal direction. Accordingly, the suction holding portion 92 can be adjusted in horizontal position in an X-Y plane by the rotation of the rotating shaft 90 and the expansion and contraction of the expansive arm 91 and also adjusted in vertical position (Z direction) by the vertical movement of the rotating shaft 90.

The holding table 2 includes a suction holding portion 20 for holding the wafer W under suction. A fixing portion 21 for fixing the ring frame F supporting the wafer W is provided on the outer circumference of the suction holding portion 20. The fixing portion 21 has a pressing portion 210 for pressing the ring frame F from the upper side thereof.

The holding table 2 is supported so as to be movable in a feeding direction (X direction) by feeding means 4 and also movable in an indexing direction (Y direction) perpendicular to the X direction in a horizontal plane (X-Y plane) by indexing means 5.

The feeding means 4 is provided on a platelike base 53. The feeding means 4 is composed of a ball screw 40 having an axis extending in the X direction, a pair of guide rails 41 provided on the base 53 so as to extend parallel to the ball screw 40, a motor 42 connected to one end of the ball screw 40, and a slide member 43 having a lower portion formed with an internal nut (not shown) threadedly engaged with the ball screw 40 and also formed with a pair of grooves slidably engaged with the guide rails 41. Accordingly, the holding table 2 is moved in the X direction by the feeding means 4 in such a manner that the motor 42 is operated to rotate the ball screw 40 and thereby slide the slide member 43 on the guide rails 41 in the X direction.

The holding table 2 and the feeding means 4 are supported so as to be movable in the Y direction by the indexing means 5. The indexing means 5 is composed of a ball screw 50 having an axis extending in the Y direction, a pair of guide rails 51 provided on a fixed base 1*b* so as to extend parallel to the ball screw 50, a motor 52 connected to one end of the ball screw 50, and the base (slide member) 53 having a lower portion formed with an internal nut (not shown) threadedly engaged with the ball screw 50 and also formed with a pair of grooves slidably engaged with the guide rails 51. Accordingly, the holding table 2 and the feeding means 4 are moved in the Y direction by the indexing means 5 in such a manner that the motor 52 is operated to rotate the ball screw 50 and thereby slide the base 53 on the guide rails 51 in the Y direction.

The laser applying means 3 includes a base 30 fixed to a wall portion 1*a* and a laser head 31 fixed to the front end of the base 30. The laser head 31 has a function of applying a laser beam having an optical axis (central axis) extending in the Z direction.

In the laser processing apparatus 1 shown in FIG. 1, the feeding means 4 and the indexing means 5 are configured so as to move the holding table 2 in the X direction and the Y direction, respectively, and the laser applying means 3 is configured so as not to be moved. However, the configuration of the laser processing apparatus 1 is not limited to that shown in FIG. 1 provided that the holding table 2 and the laser applying means 3 are to be relatively moved in the X direction and also to be relatively moved in the Y direction. For example, the holding table 2 may be movable in the X direction and the laser applying means 3 may be movable in the Y direction. As another modification, the holding table 2 may be unmovable and the laser applying means 3 may be movable in the X direction and the Y direction.

Figure 2:
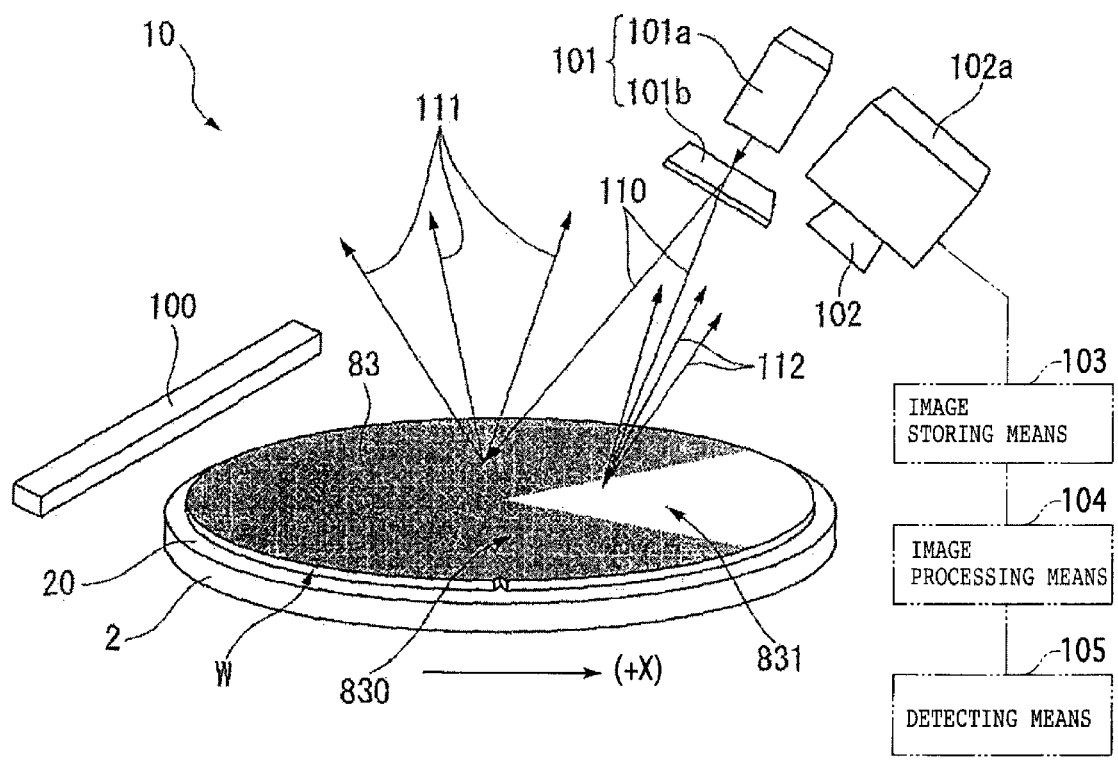
FIG. 2 is a perspective view showing a first preferred embodiment of the protective film detecting unit.

The laser processing apparatus 1 further includes a protective film detecting unit 10 for detecting whether or not the protective film has been formed on the wafer W in a desired area thereof. As shown in FIG. 2, the protective film detecting unit 10 includes droplets forming means 100 for forming minute droplets on the front side Wa of the wafer W held on the holding table 2, light applying means 101 for applying light to the front side Wa of the wafer W, imaging means 102 for imaging the front side Wa of the wafer W, image storing means 103 for readably storing an image obtained by the imaging means 102, image processing means 104 for processing the image stored in the image storing means 103, and detecting means 105 for detecting an area where the protective film is not formed. The image storing means 103 is configured by a memory such as a RAM. The image processing means 104 is configured by a CPU or the like.

The droplets forming means 100 is provided above the path of movement of the holding table 2 in the X direction. The droplets forming means 100 is elongated in the direction (Y direction) perpendicular to the path of movement of the holding table 2 in the X direction in a horizontal plane (X-Y plane). The length of the droplets forming means 100 in the Y direction is set equal to or greater than the diameter of the suction holding portion 20 of the holding table 2. The droplets forming means 100 includes a spray area having a plurality of fine spray holes arranged in the Y direction, for example. This spray area has a length equal to or greater than the outer diameter of the workpiece (wafer W). This spray area is configured so as to spray a mist or steam toward the workpiece in the X direction and the Z direction. The size of each minute droplet to be formed may be set to one to tens of μm. It is sufficient that the droplets forming means 100 can form the minute droplets on the upper surface (work surface) of the workpiece, and the condition of a liquid to be supplied from the droplets forming means 100 is not limited to a mist or steam.

The light applying means 101 is composed of a light emitting portion 101*a* for emitting light and a diffusing plate 101*b* for diffusing the light emitted from the light emitting portion 101*a*. The light emitting portion 101*a* is a light source for emitting infrared light, for example. The light emitted from the light emitting portion 101*a* is passed through the diffusing plate 101*b* and thereby applied to the whole surface of the front side Wa of the wafer W, so that nonuniform application of the light to the front side Wa can be suppressed.

The imaging means 102 is configured by a camera, for example. The imaging means 102 is held by a movable holding portion 102*a*. By moving the holding portion 102*a*, the imaging means 102 can be moved to a position where it can image the whole of the front side Wa of the wafer W. In FIG. 1, all of the light applying means 101, the imaging means 102, the image storing means 103, the image processing means 104, and the detecting means 105 are not shown. In FIG. 2, the fixing portion 21 is not shown.

The operation of the laser processing apparatus 1 shown in FIG. 1 will now be described. First, the operation in forming a protective film on the front side Wa of the wafer W as the work surface of the workpiece will now be described. The wafer W supported through the tape T to the ring frame F is stored in the cassette 60. The wafer W is taken out of the cassette 60 in such a manner that the ring frame F is held by the holding portion 70 of the handling means 7 and next moved by the handling means 7 in the +Y direction to reach the temporary placing area 61. Thus, the wafer W is placed in the temporary placing area 61. Thereafter, the wafer W is set to a predetermined position by the guide portion 62, and then transferred to the protective film forming means 8 by the transfer mechanism 9.

Figure 3:
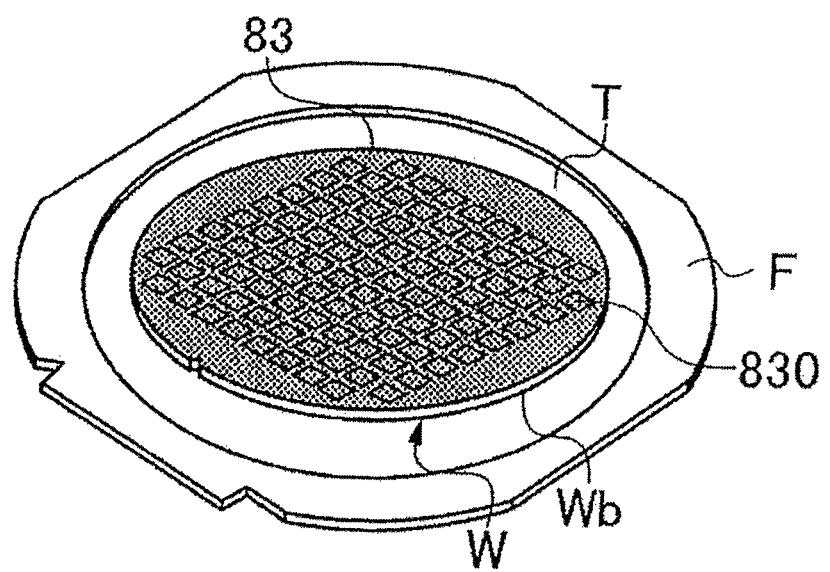
FIG. 3 is a perspective view of a wafer supported through a tape to a ring frame in the condition where a protective film is formed on the front side of the wafer.

In the protective film forming means 8, the wafer W is held on the holding table 80 and the ring frame F is fixed by the fixing portion 81. Thus, the wafer W is held on the holding table 80 in the condition where the front side Wa of the wafer W is oriented upward. In this condition, the liquid resin is dropped from the nozzle 820 onto the front side Wa of the wafer W, and the holding table 80 is lowered and then rotated to thereby spread the liquid resin over the whole surface of the front side Wa. As a result, a protective film 83 is formed so as to fully cover the whole surface of the front side Wa of the wafer W as shown in FIG. 3. Examples of the liquid resin include a water-soluble resin such as polyvinyl alcohol (PVA) containing an absorbent for absorbing light having the wavelength of the laser beam to be applied from the laser applying means 3. In the case of using a laser beam having an ultraviolet wavelength region (e.g., 355 nm) as the laser beam to be applied from the laser applying means 3, an ultraviolet absorber for absorbing light in the ultraviolet region (e.g., 250 to 380 nm) is added as the absorbent to the water-soluble resin. Examples of the ultraviolet absorber include benzophenone, benzotriazole, triazine, and benzoate plastic additives. In the case of using a laser beam having a visible wavelength region (e.g., 533 nm), a light absorber for absorbing light in the visible region (e.g., 460 to 650 nm) is added as the absorbent to the water-soluble resin. Examples of the light absorber includes water-soluble dye compounds and water-soluble pigment compounds.

In the case that the liquid resin is solidified and sticks to the nozzle 820 and therefore it is not sufficiently sprayed from the nozzle 820, there is a possibility that not only a glossy coated area 830 where the protective film 83 is completely formed, but also an uncoated area 831 where the protective film 83 is not completely formed may be formed on the front side Wa of the wafer W as shown in FIG. 2.

Figure 4:
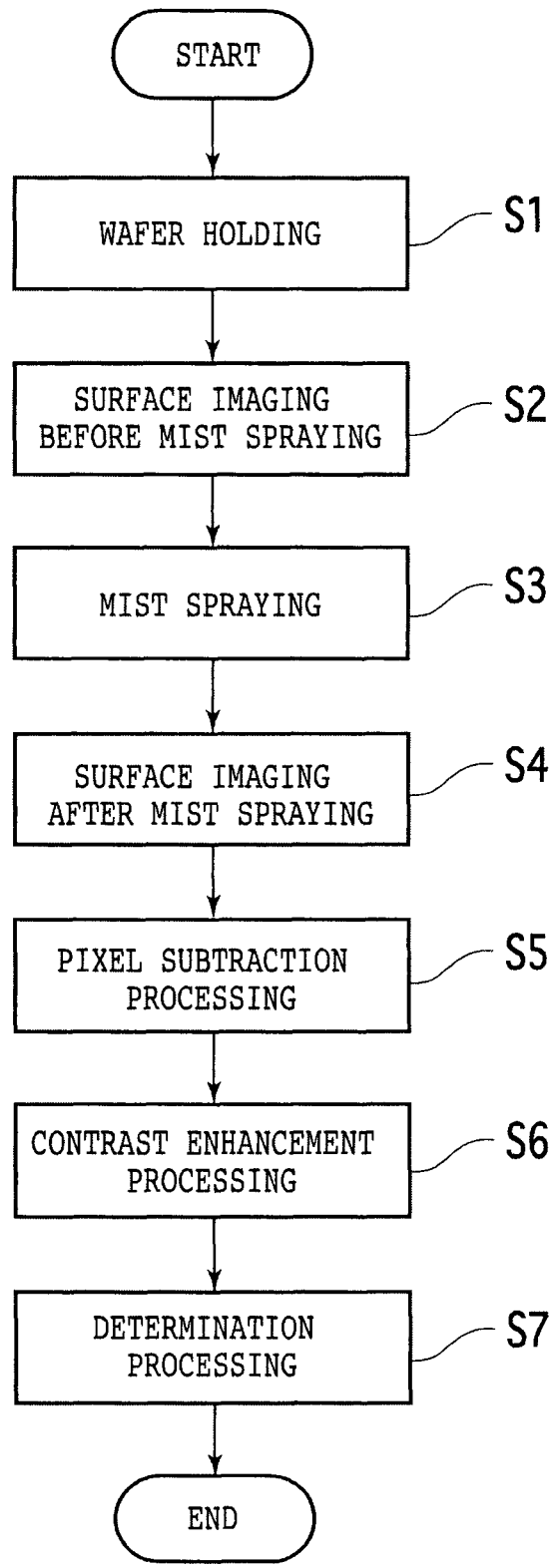
FIG. 4 is a flowchart showing a procedure of detection of the protective film.

There will now be described a method of detecting whether or not the protective film 83 is actually formed, with reference to the flowchart shown in FIG. 4. In this method, a mist is sprayed by the droplets forming means 100.

(1) Holding Step

First, the wafer W is transferred from the protective film forming means 8 to the holding table 2 by the transfer mechanism 9 after forming the protective film 83 on the front side Wa of the wafer W. Thereafter, the wafer W is held under suction on the suction holding portion 20 of the holding table 2, and the ring frame F is fixed by the fixing portion 21 (step S1).

(2) Imaging-Before-Spraying Step

After performing the holding step, the holding table 2 holding the wafer W is moved in the +X direction by the feeding means 4. During the movement of the wafer W in the +X direction, the wafer W is passed below the droplets forming means 100. However, no mist is sprayed from the droplets forming means 100 at this time. After passing below the droplets forming means 100, the holding table 2 holding the wafer W is further moved in the +X direction. During this movement, infrared light is applied from the light applying means 101 to the front side Wa of the wafer W as shown in FIG. 2. Thereafter, the infrared light is selectively detected by the imaging means 102 to image the front side Wa of the wafer W. Image information obtained by the imaging means 102 is stored into the image storing means 103 (step S2).

(3) Droplets Forming Step

Figure 5:
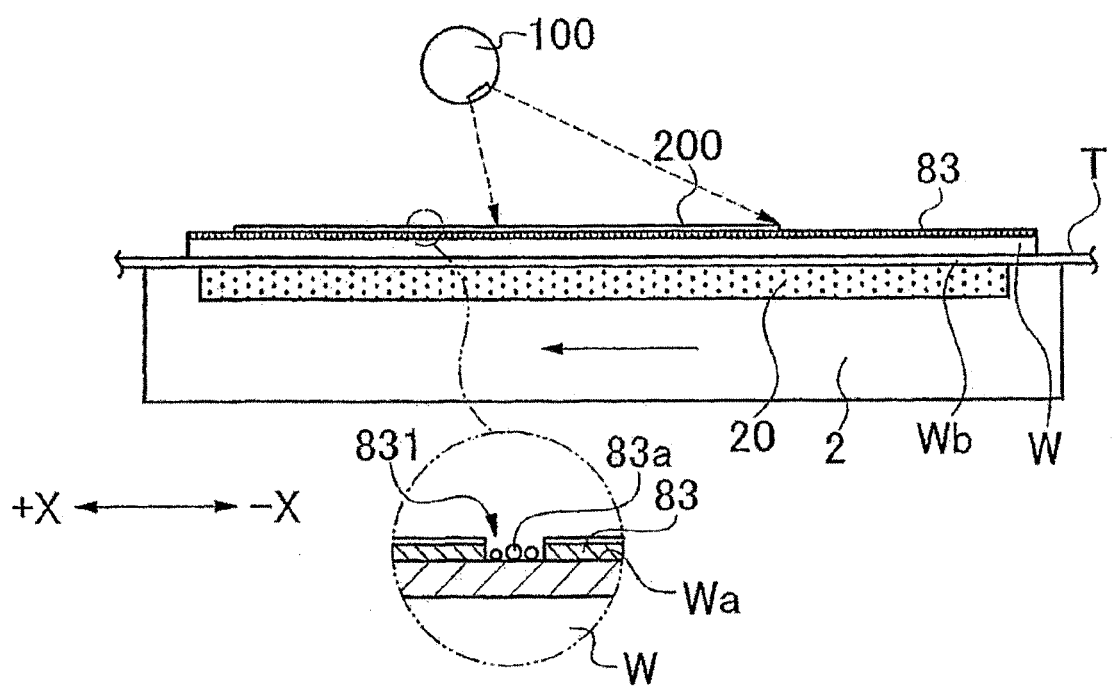
FIG. 5 is a partially sectional, elevational view showing a condition where a mist is sprayed to the front side of the wafer.

Thereafter, the holding table 2 holding the wafer W is moved in the −X direction to the original position shown in FIG. 1. Thereafter, as shown in FIG. 5, the holding table 2 holding the wafer W is moved in the +X direction. During this movement, the wafer W is passed below the droplets forming means 100, and a mist 200 is sprayed from the droplets forming means 100. In the case that the uncoated area 831 is present on the front side Wa of the wafer W as shown in FIG. 2, the mist 200 sprayed enters the uncoated area 831.

Figure 6:
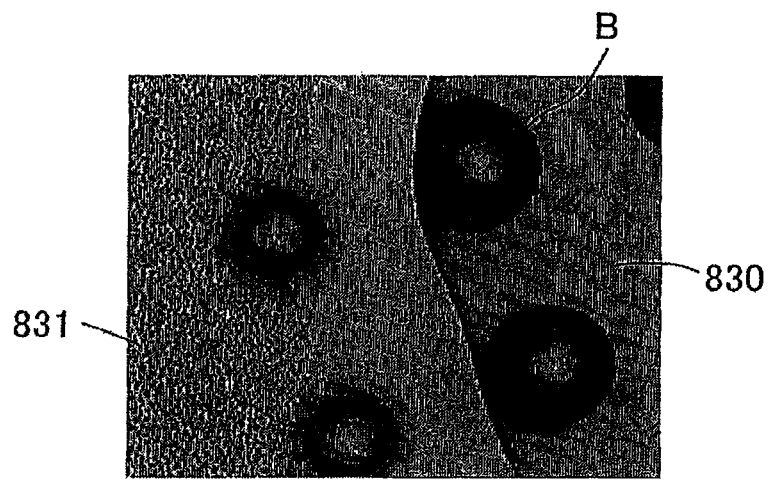
FIG. 6 is a photograph showing an image obtained by imaging means.

When the mist 200 enters the uncoated area 831, minute droplets 83a stick to the front side Wa of the wafer W as shown in FIG. 5, so that asperities due to the droplets 83a are formed in the uncoated area 831. When the minute droplets 83a stick to the uncoated area 831 of the front side Wa of the wafer W to thereby form the asperities as mentioned above, the front side Wa in the uncoated area 831 becomes a mat surface as shown in FIG. 6. On the other hand, the mist 200 sprayed to the coated area 830 of the front side Wa of the wafer W becomes wet because of the hydrophilicity of the protective film 83, so that no droplets are formed in the coated area 830. Thusly, no asperities are formed in the coated area 830, whereas the asperities due to the droplets 83a are formed in the uncoated area 831. Steam may be used instead of the mist 200 to form the droplets 83a. In the case that a mist substantially composed of only water is used as the mist 200, the protective film 83 may be expanded and damaged. To cope with this damage, the resin forming the protective film 83 may be mixed with water to form a mist, and this mist containing the resin may be sprayed to repair the damage of the protective film 83 (step S3). As another modification, alcohol (e.g., lower alcohol such as ethanol) and/or resin may be mixed with water mist to thereby form the droplets. In this case, the resin to be mixed may be the resin forming the protective film 83. By mixing the alcohol, damage to the protective film 83 can be suppressed. In the image shown in FIG. 6, reference symbol B denotes a bump formed on the front side Wa of the wafer W.

(4) Imaging-After-Spraying Step

After performing the droplets forming step, the holding table 2 holding the wafer W is further moved in the +X direction. Thereafter, as shown in FIG. 2, infrared light is applied from the light applying means 101 to the front side Wa of the wafer W. Thereafter, the infrared light is selectively detected by the imaging means 102 to image the front side Wa to which the mist 200 is sprayed. The infrared light emitted from the light emitting portion 101a of the light applying means 101 is passed through the diffusing plate 101b to obtain diffused light 110 as shown in FIG. 2. The diffused light 110 is applied to the whole surface of the front side Wa of the wafer W. In the coated area 830, almost no asperities due to droplets are present, so that reflected light 111 obtained by the reflection of the diffused light 110 from the coated area 830 of the front side Wa is higher in intensity and uniform. On the other hand, in the uncoated area 831, the asperities due to the droplets 83a are present, so that reflected light 112 obtained by the reflection of the diffused light 110 from the uncoated area 831 of the front side Wa is scattered light obtained by Mie scattering due to the asperities. Accordingly, the image obtained by the imaging means 102 has a difference in light intensity between the coated area 830 and the uncoated area 831. That is, the image of the uncoated area 831 is darker than the image of the coated area 830 where the protective film 83 is properly formed.

The image obtained by the imaging means 102 is stored into the image storing means 103. As a modification, a light source for emitting visible light may be used as the light emitting portion 101a. However, the visible light is susceptible to ambient illumination light. Further, a camera capable of detecting near infrared light is easily available at low cost in general. Accordingly, a light source for emitting infrared light low in energy and less susceptible to ambient illumination light may be used as the light emitting portion 101a (step S4).

(5) Detecting Step

Thereafter, the image processing means 104 performs subtraction processing between the image stored into the image storing means 103 in the imaging-before-spraying step before spraying the mist and the image stored into the image storing means 103 in the imaging-after-spraying step after spraying the mist, thereby obtaining difference information. That is, information on an unchanged portion between the image before spraying the mist and the image after spraying the mist is excluded and information on only a changed portion is extracted as this difference information. For example, in the case that bumps or the like are formed on the front side Wa of the wafer W, it is possible to exclude information on any objects including the bumps that may cause the confusion with respect to the droplets (step S5).

Thereafter, the image processing means 104 performs binarization processing or the like to the difference information obtained in step S5, thereby enhancing the contrast of the image. By performing this processing, a target portion to be detected can be clearly grasped (step S6).

Thereafter, the detecting means 105 detects a difference in light intensity between the coated area 830 where the protective film 83 is formed and the uncoated area 831 where the protective film 83 is not formed, according to the result of computation in step S6. According to the difference in light intensity, the dark area where the light intensity is low is determined as the uncoated area 831. In contrast, in the case that no difference in light intensity is detected and the image is uniform in brightness, it is determined that the uncoated area 831 is absent and the protective film 83 is uniformly formed on the whole surface of the front side Wa (step S7). As a modification, the imaging-before-spraying step may be omitted and only the image obtained by the imaging-after-spraying step may be used to detect the uncoated area 831.

In the case that the uncoated area 831 is detected, a warning lamp is lit or a warning message is indicated on a display portion to inform an operator that the uncoated area 831 has been detected. Then, the operator operates the laser processing apparatus 1 to transfer the wafer W from the holding table 2 to the protective film forming means 8 again, wherein the liquid resin is dropped onto the uncoated area 831 to uniformly form the protective film 83 on the whole surface of the front side Wa.

As shown in FIG. 2, in the laser processing apparatus 1, the holding table 2 holding the wafer W is passed below the droplets forming means 100 and just thereafter passed below the imaging means 102. Accordingly, just after the mist is sprayed from the droplets forming means 100 to the whole surface of the front side Wa of the wafer W, the whole surface of the front side Wa of the wafer W can be imaged by the imaging means 102. Accordingly, the mist spraying by the droplets forming means 100 and the imaging by the imaging means 102 can be continuously performed to thereby improve the efficiency.

After detecting whether or not the protective film 83 is properly formed on the front side Wa of the wafer W and forming the protective film 83 on the front side Wa as required, a predetermined one of the division lines L of the wafer W shown in FIG. 1 and the laser head 31 of the laser applying means 3 are positioned in the Y direction so that the predetermined division line L is positioned directly below the laser head 31. In this condition, the holding table 2 holding the wafer W is moved in the X direction and at the same time the laser beam is applied from the laser head 31 to the wafer W, thereby processing the wafer W along the predetermined division line L. The laser beam applied is passed through the protective film 83 formed on the front side Wa of the wafer W and then focused on the front side Wa of the wafer W.

Even when debris is generated by the application of the laser beam, the debris is blocked by the protective film 83 and does not adhere to the wafer W. Further, the uncoated area 831 is preliminarily detected by the detecting means 105 and the protective film 83 is formed again so as to eliminate the uncoated area 831. Accordingly, it is possible to prevent that the debris may adhere to part of the front side Wa of the wafer W to cause a reduction in quality of each device.

Figure 7:
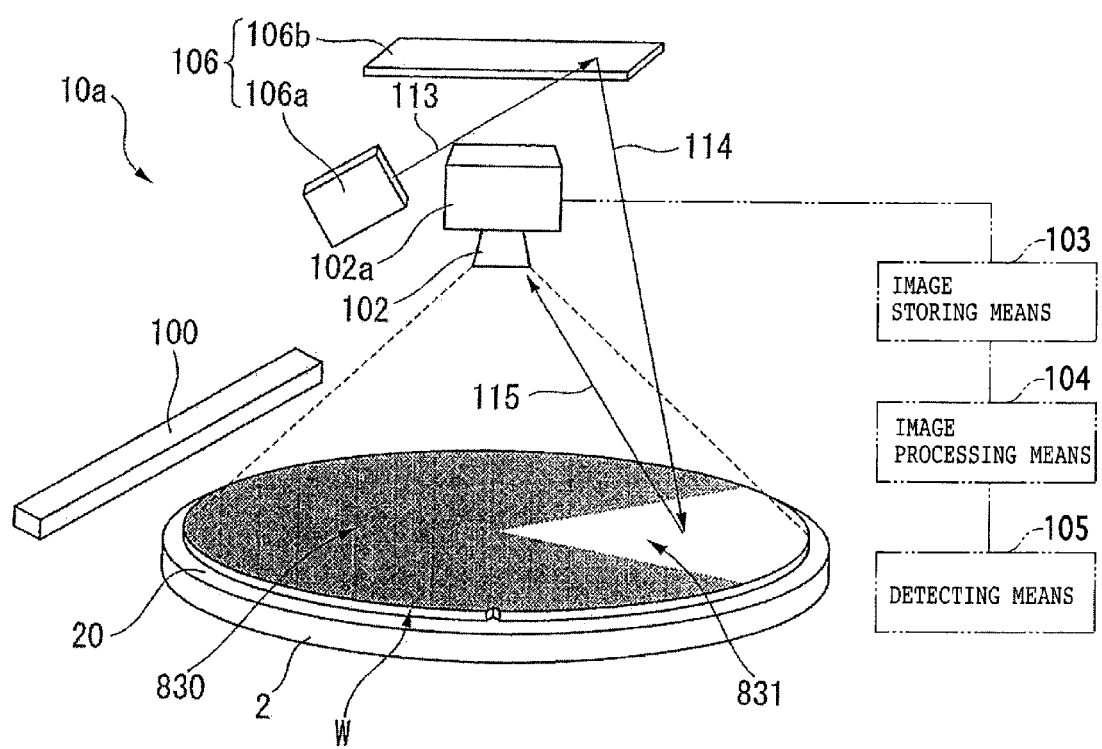
FIG. 7 is a perspective view showing a second preferred embodiment of the protective film detecting unit.

The configuration of the protective film detecting apparatus (unit) according to the present invention is not limited to that shown in FIG. 2 showing a first preferred embodiment of the present invention. For example, FIG. 7 shows a protective film detecting unit 10a according to a second preferred embodiment of the present invention. The protective film detecting unit 10a includes light applying means 106. The other components are similar to those shown in FIG. 2. The light applying means 106 is composed of a light emitting portion 106a and a diffusing and reflecting plate 106b. Light 113 emitted from the light emitting portion 106a is diffused and reflected by the diffusing and reflecting plate 106b to obtain diffused light 114. The diffused light 114 is applied to the front side Wa of the wafer W. Also in this case, the diffused light 114 undergoes Mie scattering in the uncoated area 831 to obtain reflected light 115. The reflected light 115 is detected by the imaging means 102. The diffused light 114 is also reflected from the coated area 830. By detecting a difference in light intensity between the reflected light from the coated area 830 and the reflected light from the uncoated area 831, the presence of the uncoated area 831 can be detected.

As a modification, a line sensor may be used in place of the imaging means 102. In this case, the holding table 2 and the line sensor are relatively moved in the X direction and at the same time the front side Wa of the wafer W is imaged by the line sensor to thereby detect the uncoated area 831. The length of the line sensor in the Y direction may be set equal to the diameter of the suction holding portion 20 of the holding table 2, whereby the measurement view of the line sensor has the same length as the outer diameter of the wafer W.

As another modification, a camera such as a CCD camera for imaging part of the workpiece may be used in place of the imaging means 102. In this case, either a holding portion for holding the CCD camera or the holding table 2 may have a function of moving the whole of the front side Wa of the wafer W in the range where the CCD camera can image. For example, the CCD camera may be moved in the Y direction as imaging part of the front side Wa of the wafer W. In this case, the holding table 2 is moved in the X direction and the CCD camera is moved in the Y direction as imaging the wafer W. Accordingly, the relative position or angle between the wafer W and the CCD camera is changed to image the condition of Mie scattering of the light applied from the light applying means 101 on the whole of the front side Wa of the wafer W.

While the holding table 2 is moved in the X direction in each preferred embodiment mentioned above, the droplets forming means 100 may be moved in the X direction rather than the holding table 2. In other words, it is sufficient that the holding table 2 and the droplets forming means 100 are to be relatively moved.

While the protective film detecting unit 10 or 10a is mounted in the laser processing apparatus 1 in each preferred embodiment mentioned above, the protective film detecting unit 10 or 10a may be used as a separate unit or may be mounted in any other apparatuses. Further, the workpiece on which the protective film is formed as a target to be detected by the protective film detecting unit 10 or 10a may be any workpiece other than the wafer W.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A protective film detecting apparatus for detecting whether or not a desired area of a work surface of a workpiece is actually coated with a protective film formed on the work surface of the workpiece, the protective film detecting apparatus comprising:
 a holding table for holding the workpiece in a condition where the protective film is formed on the work surface of the workpiece;
 droplets forming means for forming droplets on the work surface of the workpiece held on the holding table;
 light applying means having a light source for emitting light to apply the light to the work surface of the workpiece held on the holding table;
 imaging means for imaging the work surface of the workpiece;

image storing means for readably storing an image obtained by the imaging means;

image processing means for processing the image stored by the image storing means; and detecting means for detecting an uncoated area where the protective film is not formed, by using a difference in light intensity between a coated area where the protective film is formed and the uncoated area where the protective film is not formed to cause the formation of asperities due to the droplets formed on the work surface of the workpiece by the droplets forming means and the occurrence of Mie scattering of the light applied from the light applying means to the asperities, the difference in light intensity being detected from information on the image obtained by the imaging means and from the result of processing by the image processing means.

2. The protective film detecting apparatus according to claim 1, wherein the light applying means applies infrared light; and the imaging means selectively detects the infrared light applied by the light applying means.

3. The protective film detecting apparatus according to claim 1, wherein the imaging means includes a camera for imaging part of the work surface of the workpiece;

either a holding portion for holding the imaging means or the holding table has a function of moving the whole of the work surface of the workpiece in a range where the imaging means can image; and a relative position or angle between the workpiece and the imaging means is changed to image the condition of Mie scattering of the light applied from the light applying means on the whole of the work surface of the workpiece.

4. A protective film detecting method for detecting whether or not a desired area of a work surface of a workpiece is actually coated with a protective film formed on the work surface of the workpiece, the protective film detecting method comprising:

a holding step of holding the workpiece in a condition where the protective film is formed on the work surface of the workpiece;

a droplets forming step of forming droplets on the work surface of the workpiece after performing the holding step;

an imaging step of applying light from a light source to the work surface of the workpiece after performing the droplets forming step and then imaging the work surface of the workpiece; and a detecting step of detecting an uncoated area where the protective film is not formed, by using a difference in light intensity between a coated area where the protective film is formed and the uncoated area where the protective film is not formed to cause the formation of asperities due to the droplets formed on the work surface of the workpiece in the droplets forming step and the occurrence of Mie scattering of the light applied to the asperities in the imaging step, the difference in light intensity being detected from an image obtained in the imaging step.

* * * * *